(12) United States Patent
Kindl et al.

(10) Patent No.: US 11,213,993 B2
(45) Date of Patent: Jan. 4, 2022

(54) TRANSFORMING STATION FOR TRANSFORMING PLASTIC PARISONS WITH SHELL-FREE MOUNTING OF THE BLOW MOULD

(71) Applicant: KRONES AG, Neutraubling (DE)

(72) Inventors: Norbert Kindl, Tegernheim (DE); Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 152 days.

(21) Appl. No.: 16/605,265

(22) PCT Filed: Apr. 25, 2018

(86) PCT No.: PCT/EP2018/060578
§ 371 (c)(1),
(2) Date: Oct. 15, 2019

(87) PCT Pub. No.: WO2018/197552
PCT Pub. Date: Nov. 1, 2018

(65) Prior Publication Data
US 2021/0138712 A1 May 13, 2021

(30) Foreign Application Priority Data
Apr. 25, 2017 (DE) ...................... 10 2017 108 793.1

(51) Int. Cl.
*B29C 49/48* (2006.01)
*B29L 31/00* (2006.01)

(52) U.S. Cl.
CPC .. *B29C 49/4823* (2013.01); *B29C 2049/4864* (2013.01); *B29C 2049/4892* (2013.01); *B29L 2031/7158* (2013.01)

(58) Field of Classification Search
CPC ........ B29C 49/4823; B29C 2049/4864; B29C 2049/4892; B29C 49/36
See application file for complete search history.

(56) References Cited

U.S. PATENT DOCUMENTS 5,486,101 A 1/1996 Guyon
2002/0076463 A1 6/2002 Petre
(Continued)

FOREIGN PATENT DOCUMENTS

DE           3613543 C1    12/1986
DE     202016101701 U1     5/2016
(Continued)

OTHER PUBLICATIONS

International Search Report dated Aug. 16, 2018 for PCT/EP2018/060578.
(Continued)

*Primary Examiner* — Robert B Davis
(74) *Attorney, Agent, or Firm* — Schmeiser, Olsen & Watts, LLP

(57) ABSTRACT

A reshaping station for reshaping plastic preforms into plastic containers, wherein the reshaping station includes a blow mold for reshaping plastic preforms into plastic containers, the blow mold having a base part, a first lateral part, and a second lateral part is provided. In the assembled state of the blow mold, the base part together with the lateral parts forms a cavity within which the plastic preforms can be expanded in order to form the plastic containers. The reshaping station also includes a support device for supporting the blow mold, and the support device has a first lateral part support and a second lateral part support, the first lateral part being arranged on the first lateral part support and the second lateral part being arranged on the second lateral part support. Also disclosed is a transforming station for transforming plastic parsons into plastic containers.

29 Claims, 9 Drawing Sheets

(56) References Cited

U.S. PATENT DOCUMENTS

| | | |
|---|---|---|
| 2003/0082262 A1 | 5/2003 | Effenberger |
| 2008/0020085 A1 | 1/2008 | Bianchini et al. |
| 2008/0181982 A1 | 7/2008 | Lane |
| 2009/0136613 A1 | 5/2009 | Linke |
| 2011/0024952 A1 | 2/2011 | Stoiber et al. |
| 2012/0091634 A1 | 4/2012 | Meinzinger |
| 2013/0040009 A1 | 2/2013 | Laumer |
| 2013/0043622 A1* | 2/2013 | Hoellriegl ............... B29C 49/48 264/572 |
| 2015/0132430 A1 | 5/2015 | Cirette et al. |
| 2015/0306828 A1* | 10/2015 | Geltinger ............... B29C 49/48 264/523 |

FOREIGN PATENT DOCUMENTS

| | | |
|---|---|---|
| EP | 0 143 878 A1 | 6/1985 |
| EP | 2208606 A2 | 7/2010 |
| EP | 2279851 A2 | 2/2011 |
| FR | 2878184 A1 | 5/2006 |
| WO | 2010128104 A2 | 11/2010 |

OTHER PUBLICATIONS

International Search Report dated Aug. 16, 2018 for PCT/EP2018/060634.

\* cited by examiner

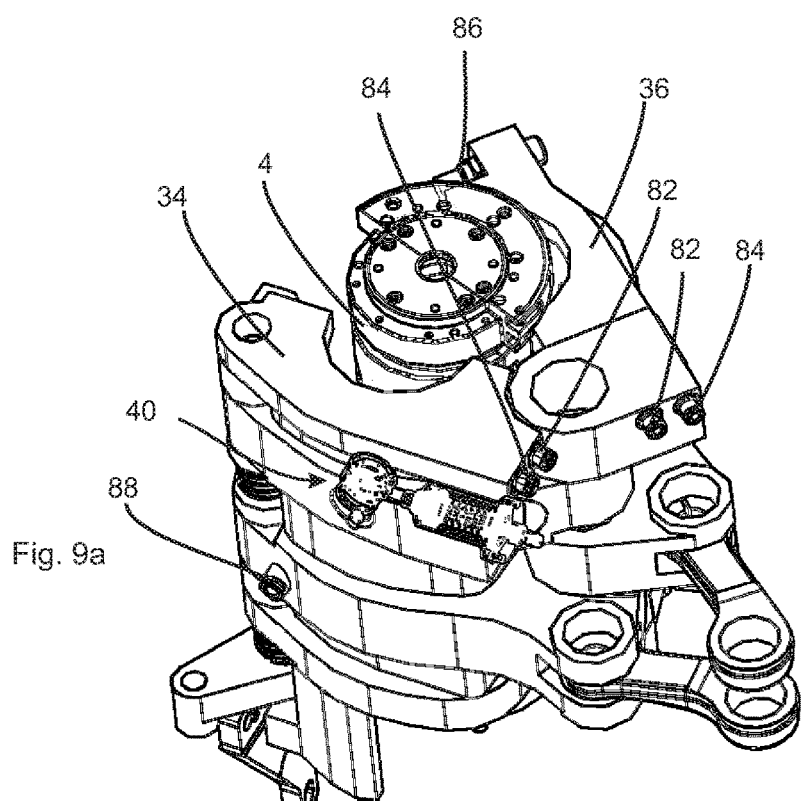
Fig. 9a
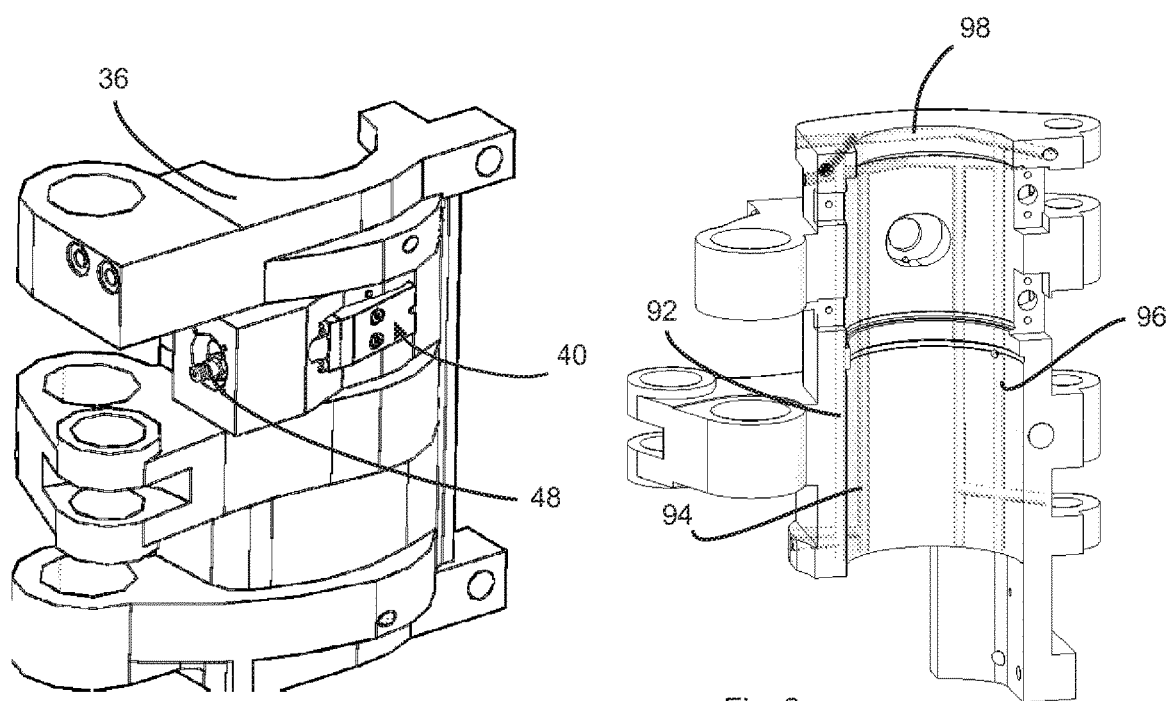
Fig. 9b
Fig. 9c

TRANSFORMING STATION FOR TRANSFORMING PLASTIC PARISONS WITH SHELL-FREE MOUNTING OF THE BLOW MOULD

CROSS-REFERENCE TO RELATED APPLICATIONS

This application claims priority to PCT Application No. PCT/EP2018/060578, having a filing date of Apr. 25, 2018, based on German Application No. 10 2017 108 793.1, having a filing date of Apr. 25, 2017, the entire contents both of which are hereby incorporated by reference.

FIELD OF TECHNOLOGY

The following relates to a transforming station for transforming plastic parisons into plastic containers and a reshaping station for reshaping plastic preforms.

BACKGROUND

It has long been known from the known art that heated plastic parisons are introduced into so-called transforming stations or blow moulding stations and are expanded there using compressed air to produce plastic containers and in particular plastic bottles. For this purpose, so-called blow moulds are used, which have in their interior a wall which forms the contour of the container to be produced. These blow moulds are usually retained on blow mould carriers. The blow mould carriers can be opened for introduction of the plastic parisons, then closed around the plastic parisons, and the plastic parison located in the interior is expanded by compressed air. The blow moulds are usually arranged by means of blow mould shells on the side part carriers. This procedure has proved worthwhile in the known art and in particular also contributed to the stability. However, the disadvantage of these embodiments is that such transforming stations require a relatively large amount of space or installation space.

SUMMARY

Therefore, an aspect is to reduce installation space for such systems.

Another aspect relates to a transforming station according to embodiments of the invention for transforming plastic parisons into plastic containers has a blow mould for transforming plastic parisons into plastic containers, this blow mould having a base part, a first side part and a second side part. In this case, in an assembled state of the blow mould, this base part together with the side parts form a hollow space within which the plastic parisons can be expanded to form the plastic containers. Furthermore, a carrier device is provided for carrying the blow mould, wherein the carrier device has a first side part carrier and a second side part carrier, and wherein the first side part is arranged on the first side part carrier and the second side part is arranged on the second side part carrier.

According to embodiments of the invention at least one side part is arranged directly on the side part carrier associated with it.

Therefore, according to embodiments of the invention, it is proposed to dispense with the mould carrier shells always used in the known art. The applicant has found that, in contrast to the previous assumption in the known art, under certain circumstances the mould carrier shells which are usually interposed may be unnecessary. The at least one side part lies flat on the associated side part carrier and is particularly fastened thereon. In this way a smaller overall construction is achieved. The side part carriers are advantageously pivotable with respect to one another. In particular, the side part carriers are pivotable with respect to one another and with respect to an axis which extends parallel to a longitudinal direction of the parisons to be expanded. In preferred embodiments the transforming station also has a base part carrier which is suitable and intended to support the base part for transforming of the plastic parisons. The base part is fastened to this base part carrier.

In preferred embodiments the other side part is also arranged directly on the side part carrier associated with it. Thus, in the embodiments both side parts are in each case fastened directly to the respectively associated carrier. Thus both side parts are placed directly into the respective side part carriers. These side parts have a wall or a contour which serves for formation of the plastic containers.

By this measure the required installation space for the apparatus can be further reduced.

In preferred embodiments, both side parts are arranged directly on the side part carriers associated with them without the use and/or interposition of a pressure pad. Thus, in the embodiments a pressure pad is omitted. Such pressure pads are usually used in the known art in order, when acted upon by the plastic parisons, to keep a resulting mould gap as small as possible.

Surprisingly, however, it has been shown that precisely through the omission of the shells and the resulting reduced installation space in the working region also a better pressing together of the side parts is made possible and so a pressure pad can also be omitted.

Overall in this way a significantly smaller "footprint" of the entire system can be achieved. A saving of energy and also a saving of costs can also be made possible by this procedure.

It is therefore proposed that the blow mould is placed directly and on both sides into the mould carrier and, as mentioned above, there is no need for the receiving shell.

In further advantageous embodiments at least one side part carrier and/or a side part can be temperature-controlled. In the known art the mould carrier shells are usually temperature-controlled, so that ultimately the blow moulds are also temperature-controlled. Within the context of embodiments of the present invention, however, it is proposed that the (not shown) mould carrier shells are not temperature-controlled, but in fact the actual side part carrier. However, it is pointed out that the embodiments, in which the side part carrier is temperature-controlled, can also be claimed or is proposed independently of embodiments of the invention. In the embodiments a simplification in particular of an installation operation is achieved. In this case corresponding temperature connections can remain on the machine and do not have to be replaced together with a blow mould.

The applicant therefore reserves the right also to claim protection for a transforming station for transforming plastic parisons into plastic containers with a blow mould for transforming plastic parisons into plastic containers, this blow mould having a base part, a first side part and a second side part, wherein, in an assembled state of the blow mould, this base part with the side parts form a hollow space within which the plastic parisons can be expanded to form the plastic containers and furthermore a carrier device for carrying the blow mould is provided, wherein according to embodiments of the invention this carrier device has temperature control means for controlling the temperature of the blow mould.

This temperature control can take place for example by electrical cooling elements, but this temperature control preferably takes place, as explained more precisely below, by a flowable and in particular liquid temperature control means or liquid temperature control.

Temperature control is understood to mean that the side part carrier can be acted upon or temperature-controlled by a temperature which deviates from the working temperature of the system. In particular it is possible to heat up the side part carrier in order thus also to heat up the blow mould. It would also be conceivable that the side part carriers are cooled in order in this way also to cool the blow mould side parts associated therewith.

In further advantageous embodiments at least one side part carrier and/or a side part has a temperature control means channel or temperature control channel for conducting a flowable and in particular liquid temperature control means or liquid temperature control. As mentioned above, these channels are otherwise usually arranged on the carrier shells or the blow mould. In the embodiments described here this temperature control means channel or temperature control channel is provided on the side part carrier. As mentioned above, this has the advantage that changes of blow moulds can be carried out in a less complicated manner, and in particular no installation and removal of coolant connections is necessary. Thus, it is preferred if the side part carrier has at least one temperature control means channel or temperature control channel which makes it possible to conduct a flowable temperature control means or a flowable temperature control.

In further advantageous embodiments at least one side part carrier and/or a side part has at least two media couplings. These two media couplings facilitate a forward flow and a return flow for a temperature control means or temperature control. Thus, by means of these media couplings a temperature control means or temperature control can be supplied and this medium can also be discharged again from the side part carrier. The embodiments are advantageous in particular in the case of such machines which have no pressure pad. Advantageously, both side part carriers each have temperature control means channels or temperature control channels.

In further advantageous embodiments the at least two media couplings can be released manually, semi-automatically or fully automatically. Particularly these media couplings can be released fully automatically by means of a robot. In this way robot-assisted changing of the blow moulds can be facilitated.

In further advantageous embodiments the at least two media couplings are designed to be self-sealing. Thus, these media couplings can have a sealing mechanism which closes automatically when the couplings are released and thus prevents an escape of temperature control means or temperature control.

In further preferred embodiments the transforming station is designed to be sterilisable. The transforming station is equipped with materials and elements which facilitate the application of the transforming station with an (in particular flowable) sterilising medium.

In further preferred embodiments the transforming station, at least in operating mode, can be arranged in a clean room. This is a clean room which at least surrounds the transport path of the transforming stations. In this case, in operating mode, this clean room can surround the transforming stations in a channel-like manner. This is a clean room which does not surround other components of the entire transforming station, such as in particular but not exclusively components of the carrier on which the transforming stations are arranged In further advantageous embodiments at least one side part is fastened to the associated side part carrier by means of a fastening mechanism, and at least one component of this fastening mechanism is integrated at least partially into the side part carrier. In the embodiments described here the blow mould is temperature-controlled directly by the blow mould carrier which has the above-mentioned temperature control medium bores.

The fastening device or the fastening means or fastener for fixing the blow mould in the side part carrier are being particularly positioned directly in the side part carrier and/or produce a positively engaged or a frictional connection between the blow mould and the side part carrier. It is possible both to activate or to deactivate this fastening means or fastener as required manually, or to activate it by means of a mould change and in particular a fully automatic mould change pneumatically, hydraulically or electrically.

In further advantageous embodiments the side part carriers have centring elements which absorb the forces acting on the base mould. The axial forces acting on the base mould effective as a result of the internal pressure are transmitted into the side part carrier. The force is transmitted by a positively engaged connection between the centring element in the side part carrier and the corresponding counterpart piece in the base mould.

Advantageously, these centring elements for the base part carrier or the base part are positioned directly in the side part carrier or the mould carrier and produce a positively engaged and/or frictional connection between the base mould and the mould carrier.

In further advantageous embodiments the side part carriers have reinforcing ribs. In this case these reinforcing ribs are advantageously arranged on an outer side of the mould carrier, that is to say, on a side which lies opposite the side to which the side parts are fastened. In this case these reinforcing ribs can extend horizontally. In this case at least one such reinforcing rib is provided, at least two, and particularly at least three reinforcing ribs.

In this case these reinforcing ribs are parallel to one another. In further preferred embodiments these two side part carriers comprise the reinforcing ribs. These reinforcing ribs of the two side part carriers are offset with respect to one another in the longitudinal direction the respective side part carrier.

This means that for example the left side part of a specific transforming station has reinforcing ribs, and the right side part adjacent thereto of an adjacent transforming station likewise has reinforcing ribs and these are offset with respect to one another in the longitudinal direction. This means that during opening of the individual transforming stations these reinforcing ribs do not come into abutment with one another, but engage like reinforcing ribs of a side part in intermediate spaces between reinforcing ribs of a further side part. In this way the installation space can likewise be reduced, since the individual transforming stations can be installed closer to one another in the circumferential direction of a blow moulding wheel or carrier.

It is conceivable that the ribs of two adjacent mould carriers interengage. The side part carriers also have a continuous mould carrier structure, on which these ribs are particularly arranged. The above-mentioned cooling bores extend particularly in a rear or front region of the side part carrier in the continuous mould carrier structure. Thus, these cooling medium bores do not extend through the ribs.

Due to this arrangement of the ribs the clear opening dimension of the mould carrier system in the maximum opening position (that is to say in the region in which the plastic parisons are introduced and the blow moulded bottles are removed) can amount to approximately a factor of 1.1 to 1.5 of the maximum container diameter to be processed.

In further advantageous embodiments a mould outer contour of the side part carrier has a round or a V-shaped peripheral surface.

In further advantageous embodiments the mould outer contour or the attachment parts exhibit a diameter change in order to facilitate a vertical centring. The vertical centring is particularly constructed in an annular manner and extends in the peripheral region of the mould. Thus, on the side parts a centring element can be constructed which interacts with a corresponding counterpart piece arranged on the base part in order to achieve the centring. Thus, for example a projection arranged on the side parts can engage in a corresponding groove formed on the base part. Complementary elements which facilitate a positively engaged connection are arranged on the side part carrier.

In further preferred embodiments the blow mould parts, or the attachment parts thereof, have elements which engage in complementary elements on the mould support. In this way a secure retention of the side parts on the side part carriers can be achieved.

For this purpose, these elements are constructed in such a way that they unambiguously define an angular position of the blow mould in the side part carriers.

Furthermore, embodiments of the present invention are directed to an apparatus for transforming plastic parisons into plastic containers, which has a movable and in particular rotatable carrier on which a plurality of transforming stations of the type described above are arranged. This carrier is a so-called blow moulding wheel to which the plastic parisons are supplied and are transformed by the individual transforming stations into plastic containers and in particular plastic bottles.

In preferred embodiments the side part carriers of the transforming stations have reinforcing ribs, and the reinforcing ribs of two side part carriers which are adjacent to one another and which are associated with transforming stations adjacent to one another on the carrier, are offset above one another and in particular offset with respect to one another in a height direction of the transforming station. In this way, as mentioned above, a saving can be made on the installation space.

Furthermore, embodiments of the present invention are directed to a transforming station for transforming plastic parisons into plastic containers, which has a blow mould for transforming plastic parisons into plastic containers, wherein this blow mould has a base part, a first side part and a second side part, and in an assembled state this base part with the side parts forms a hollow space within which the plastic parisons can be expanded to form the plastic containers. Furthermore, the apparatus has a carrier device for carrying the blow mould, wherein the carrier device has a first side part carrier and a second side part carrier, and wherein the first side part is arranged on the first side part carrier and the second side part is arranged on the second side part carrier.

According to embodiments of the invention at least one side part is arranged by means of a fastening mechanism on the associated side carrier and this fastening mechanism has a tensioning element of the fastening mechanism which is movable in a tensioning direction, wherein this tensioning direction deviates from a radial direction of the blow mould part.

In preferred embodiments this fastening mechanism is integrated into a side part carrier. Thus, it would be possible that this fastening mechanism is built directly into the wall of the side part carrier.

Thus, here a manner of fastening is proposed, in which a fastening element does not extend in the radial direction away from the blow mould carrier, as is usual as in the known art, but extends in an angularly offset direction.

As shown more precisely in the drawings, by this procedure it is possible to make savings on installation space. In the known art these tensioning directions usually extend for example in a tangential direction relative to an opening movement of the blow moulds and thus giving rise to a high requirement for installation space. Due to the deviation from this direction, savings can be made on installation space and in particular installation space, which is required if adjacent blow moulds have to be opened during operation.

Thus, this radial direction is defined in particular with respect to a circular cross-section of the blow mould parts. More precisely, a geometric central axis can be defined which is usually also a central axis of the plastic parison to be expanded. A radial direction intersects this central axis. However, the tensioning direction described here is positioned obliquely in relation to this central axis and does not intersect it.

The embodiments according to the invention can be used both in variants employed which use a blow mould carrier shell, and also in variants which do not have such a blow mould carrier shell.

In preferred embodiments the fastening mechanism has an engageable projection fastened to the blow mould part, as well as an engagement element which engages behind this projection at least in part, wherein this engagement element is movable in the tensioning direction. In this case it is possible that this engagement element is mounted on a slide, which in turn is movable in the tensioning direction and/or extends in this direction.

In further advantageous embodiments the tensioning direction is inclined relative to a tangential direction of the side part by an angle which is less than one of 80°, less than 70°, less than 60°, less than 50°, less than 40° and particularly less than 30° and less than 20° and less than 15° and particularly preferably less than 10°. Due to this very oblique inclination, savings can be made on installation space for the system, as explained more precisely below. The above-mentioned radial direction can also be defined as a direction which is perpendicular to a plane which, on the one hand, is defined by a longitudinal direction, in particular a vertical direction, and, on the other hand, by a radial main direction which is defined by the transforming station in the direction of a centre of rotation of a carrier on which the transforming stations arranged.

In further advantageous embodiments the tensioning direction is arranged relative to the radial direction at an angle different from 0°.

A group of these radial directions is located in a plane which is defined by the radial direction and the radial main direction and which is in particular a horizontal plane.

In further advantageous embodiments the tensioning direction is inclined relative to the tangential direction or the radial direction by an angle which is greater than 5°, greater than 7°, greater than 10° and particularly greater than 12°. These angular ranges have proved particularly favourable in order on the one hand to facilitate a favourable transmission of force, but on the other hand to ensure this with a tensioning path which is still acceptable.

In further advantageous embodiments the tensioning direction relative to the radial direction is arranged at an angle greater than 20°, greater than 30°, greater than 40°, greater than 45°, greater than 50°, greater than 60°, greater than 70° and greater than 75°. The tensioning direction relative to the radial direction is arranged at an angle less than 95°, less than 91°. In further preferred embodiments the tensioning direction and the radial direction can also be arranged at an angle of 90° relative to one another.

In further advantageous embodiments, the tensioning element has a piston to which pressure can be applied. Thus, it is possible for example that the fastening is released in the event of a corresponding application of pressure. This is advantageously a pneumatically actuated piston or a hydraulically actuated piston. Particularly a pneumatically actuated piston is used.

In further advantageous embodiments this piston to which pressure can be applied has an inclined surface for movement of the engagement element. In this case it would be conceivable that this inclined surface of the piston directly interacts with a corresponding inclined surface of the engagement element in order to move this surface. However, it would also be conceivable and preferable that this inclined surface moves a further element, and this further element in turn interacts with an inclined surface of the engagement element in order to move it.

In further advantageous embodiments the inclined surface of the piston element actuates an expansion element which is movable in a direction perpendicular to the tensioning direction.

In this case this inclined surface can be formed on and end portion of the piston element. In further preferred embodiments the piston to which pressure can be applied has two inclined surfaces which in each case actuate one or more engagement elements at least indirectly. These two inclined surfaces are formed in a roof-like manner relative to one another.

In further advantageous embodiments, the engagement element is a wedge element with a wedge surface. In this case this wedge surface can be inclined relative to the tensioning direction by a predetermined angle, in particular different from 0°. This angle is one of greater than 5°, greater than 7°, and greater than 10°. Furthermore, this angle is one of less than 30°, less than 25°, less than 20° and particularly less than 18°.

The wedge surface is inclined relative to the tensioning direction by an angle of for example 15°. In this case it is possible that this wedge surface in turn is perpendicular to the above-mentioned radial direction or parallel to a tangential direction.

In further advantageous embodiments the engagement element is formed as a sleeve-like body. In this case this sleeve-like body surrounds the projection arranged on the side part and engages behind this.

Particularly on this sleeve-like engagement element an inclined surface is formed which serves for moving the engagement element particularly in the case of interaction with a further inclined surface.

In further advantageous embodiments the sleeve body is movable in a direction which deviates from the tensioning direction and which in particular is perpendicular to the tensioning direction. In this way it would even be possible that the tensioning direction is perpendicular to the radial direction of the blow mould.

In preferred embodiments, the fastening mechanism has a spring element which forces the fastening mechanism into a closed position. This means that a release of the fastened mechanism takes place through application for example of compressed air, but the fastening mechanism is usually, that is to say, without external action, in a closed position. In this case the spring element acts on the piston under pressure.

In further advantageous embodiments, the tensioning element is arranged on the side part carrier. This means that the fastening mechanism or the tensioning element can be actuated by means of an access to the side part carrier.

Furthermore, the embodiments described above can also be applied to the transforming station described here.

Furthermore, embodiments of the present invention are directed to an apparatus for transforming plastic parisons into plastic containers, which has a movable and in particular rotatable carrier on which a plurality of transforming stations of the type described above are arranged.

BRIEF DESCRIPTION

Some of the embodiments will be described in detail, with reference to the following figures, wherein like designations denote like members, wherein:

FIG. 9a shows a representation of the side part carriers;

Figure 10:
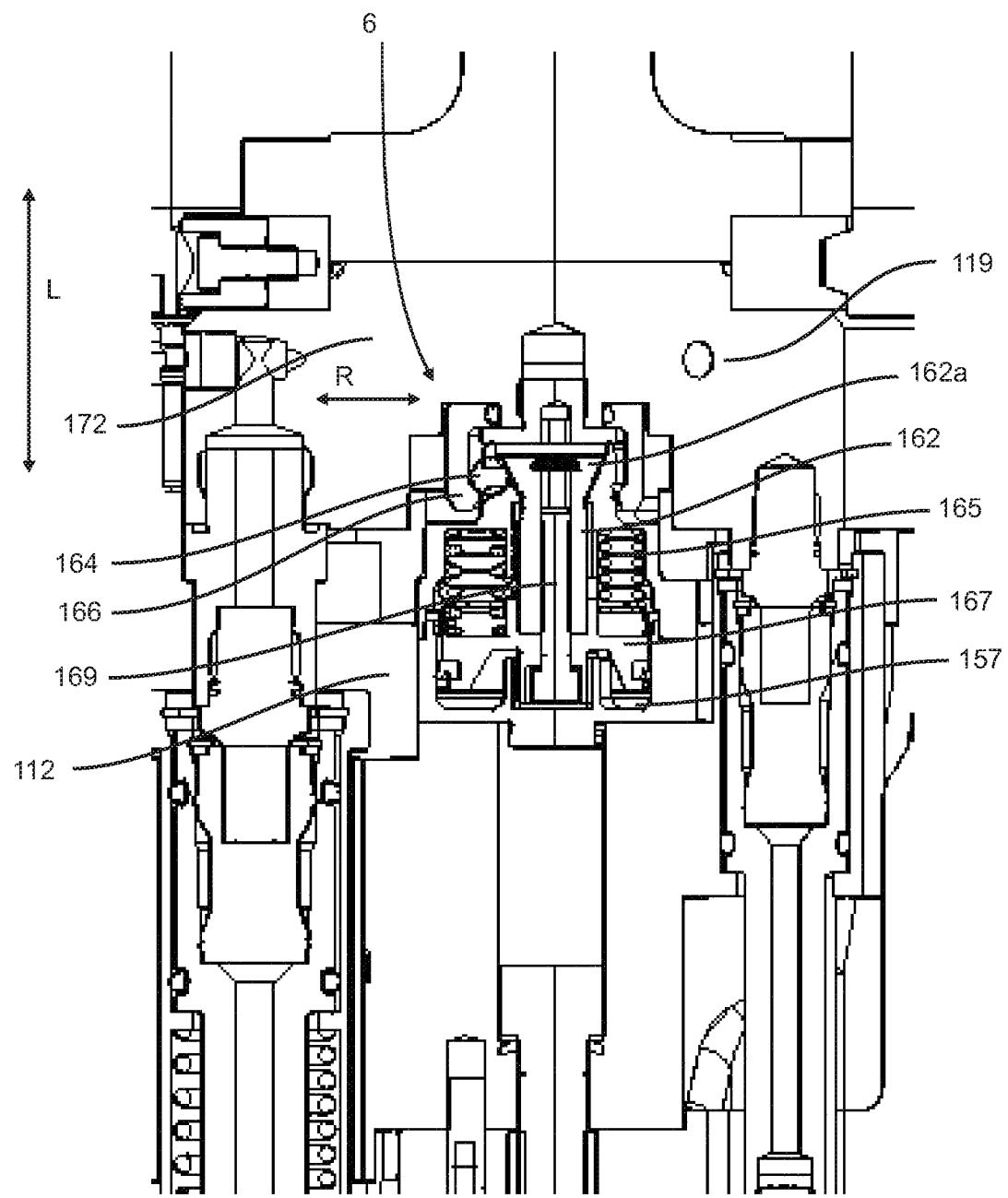
Figure 11A:
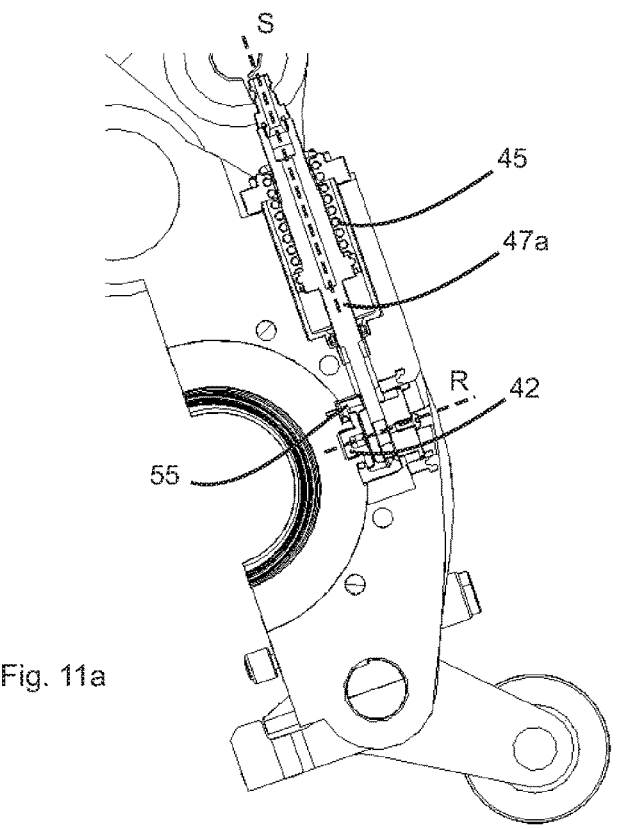
Figure 11B:
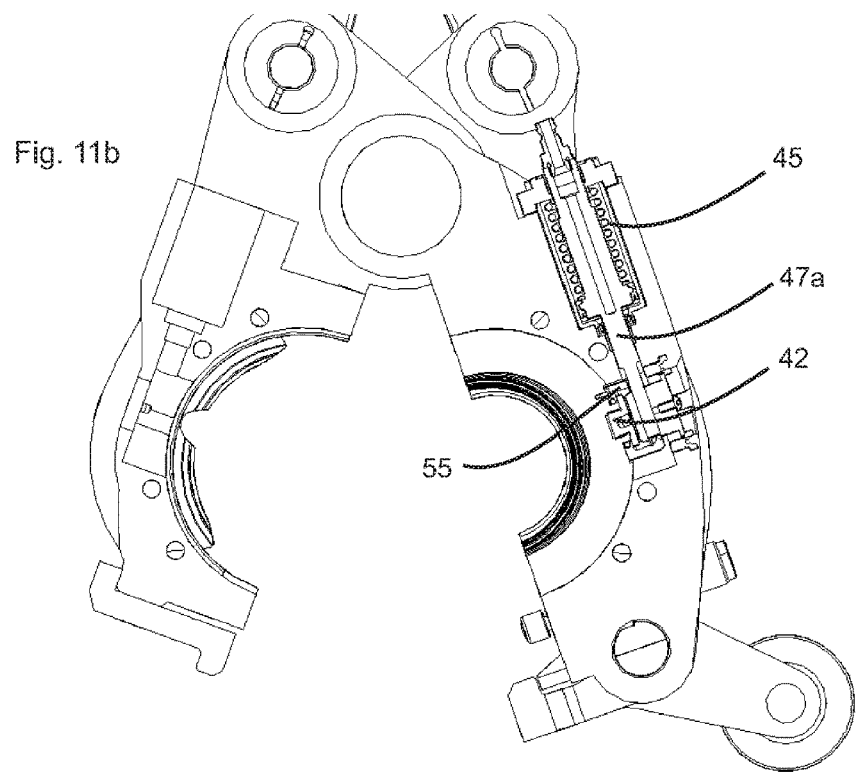
Figure 12A:
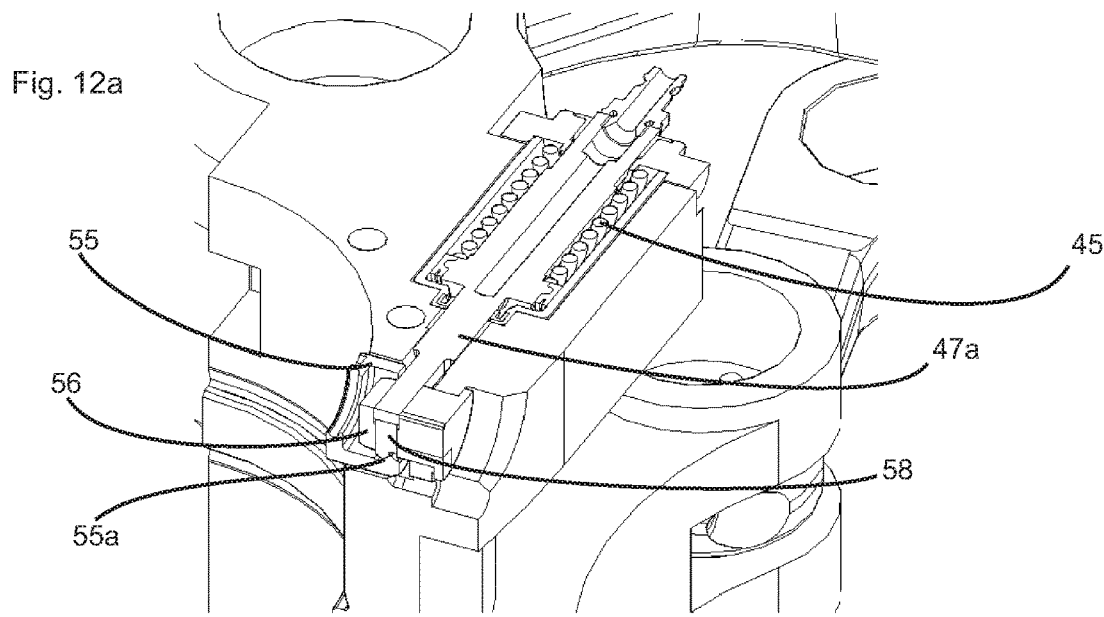
Figure 12B:
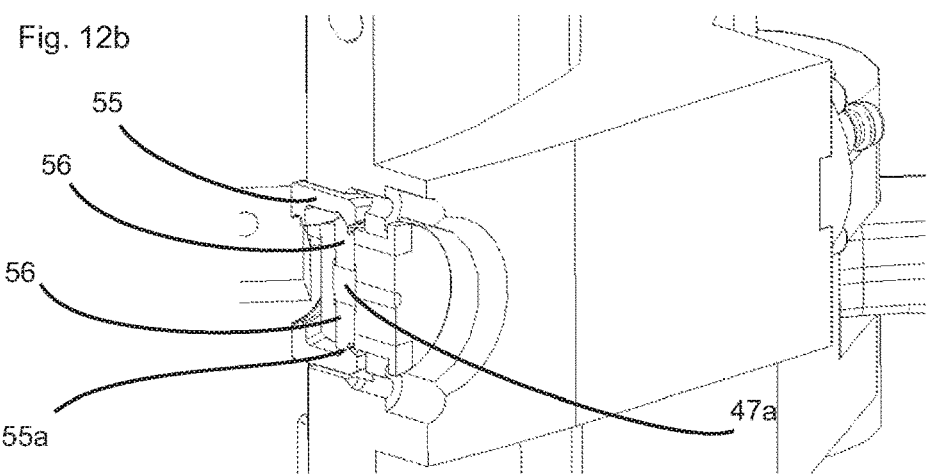
Figure 12C:
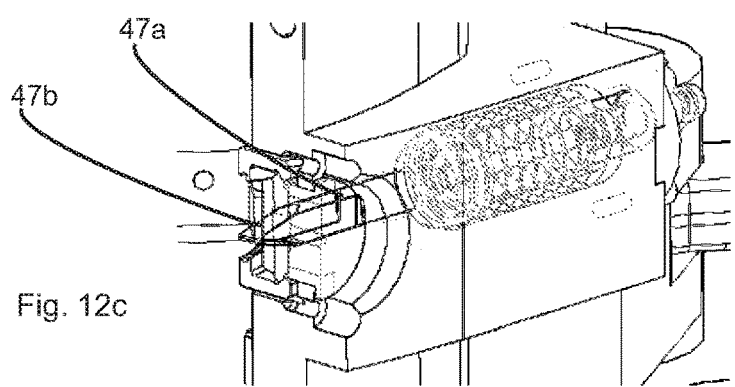

FIG. 9b a first side part carrier of 9a;

FIG. 9c a second part carrier of 9a;

FIG. 10 shows a further representation of an alternative fastening mechanism;

FIG. 11a shows a first representation of a further alternative fastening mechanism;

FIG. 11b shows a second representation of a further alternative fastening mechanism;

FIG. 12a shows a first representations of the fastening mechanism shown in FIGS. 11a, b;

FIG. 12b shows a second representations of the fastening mechanism shown in FIGS. 11a, b; and FIG. 12c shows a third representations of the fastening mechanism shown in FIGS. 11a, b.

DETAILED DESCRIPTION

Figure 1:
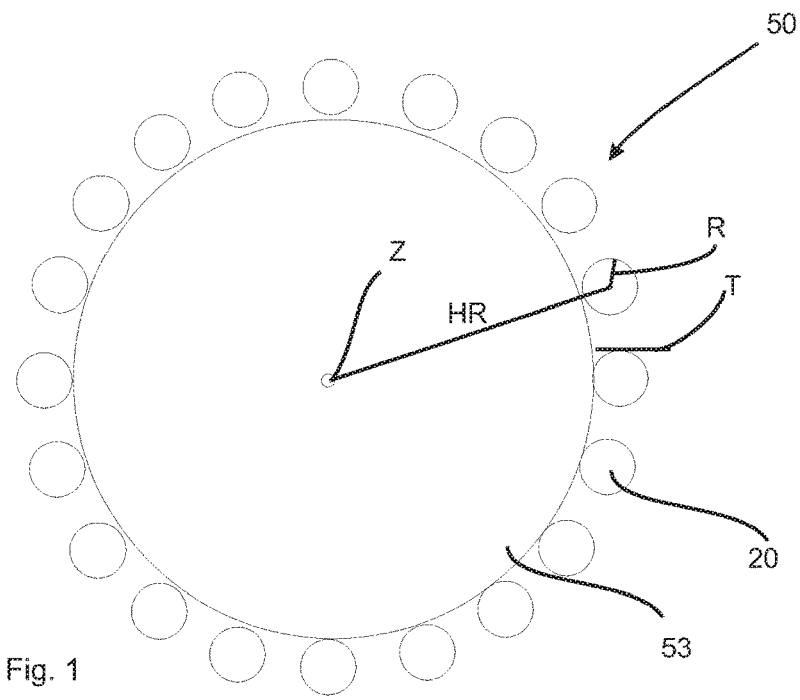
FIG. 1 shows a quite schematic representation of an apparatus for transforming plastic parisons into plastic containers.

FIG. 1 shows a rough schematic representation of a system for transforming plastic parisons into plastic containers. This device has a rotatable carrier 53 on which a plurality of transforming stations 20 are arranged. These transforming stations can each receive plastic parisons and can expand them to plastic containers by the action of compressed air. The reference HR designates a radial main direction which extends from the centre of rotation Z of the carrier 53 to a geometric centre point M of the individual transforming stations. The reference R designates a radial direction which extends starting from the centre point of the individual transforming stations. Thus, the radial direction R is in each case relative to the individual transforming stations. The reference T designates a tangential direction (tangentially relative to the individual transforming stations or blow moulds), which is explained below.

Figure 2:
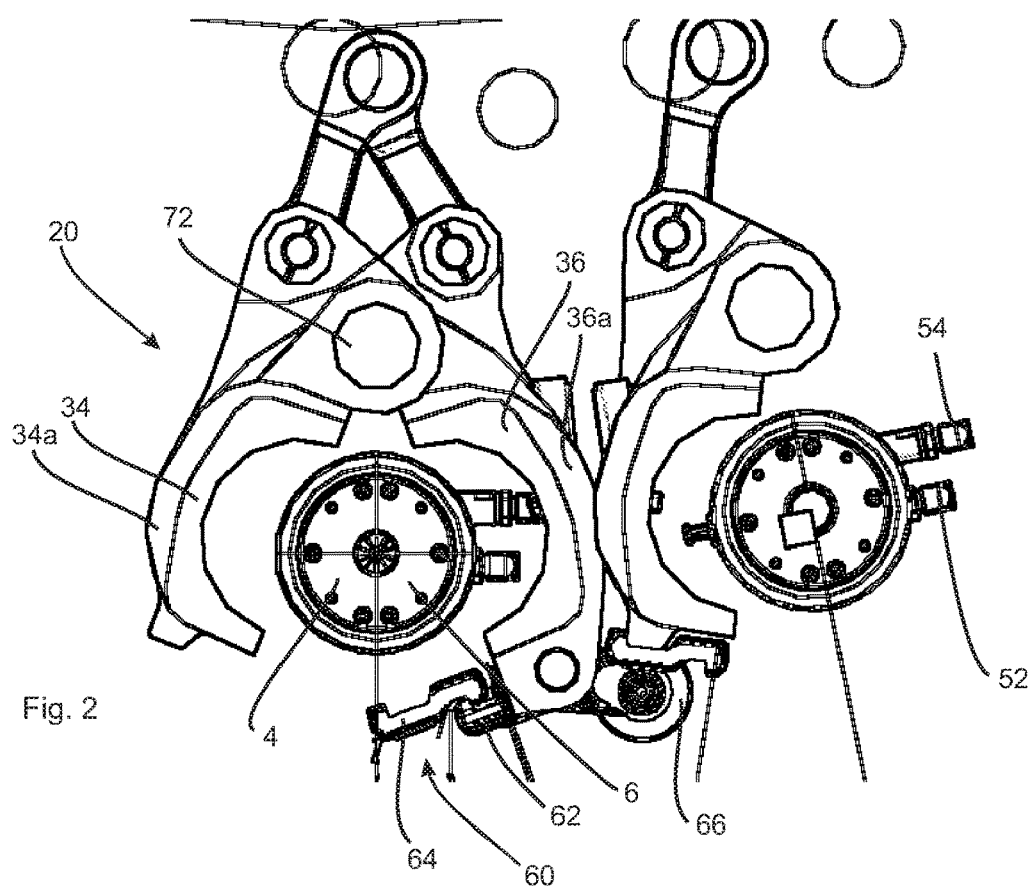
FIG. 2 shows a plan view of a transforming station according to embodiments of the invention.

FIG. 2 shows a representation of a transforming station 20. This transforming station here is shown in a state in which the two-side part carrier 34 and 36 are opened. The references 34a and 36a relate to reinforcing ribs which are arranged on side part carriers 34 and 36 and which are directed outwards with respect to the blow mould, the side parts 4 and 6 of which are visible.

The reference 60 designates a locking mechanism in order in an operating mode to lock the two side part carriers 34 and 36 to one another. In this way the blow mould is also held in a closed state.

The reference numeral 72 designates a shaft with respect to which the two side part carriers 36 are pivotable. This shaft extends here perpendicular to the drawing plane, that is to say, in operating mode in a vertical direction.

The locking mechanism 60 has a locking element 62 (which is shown here separately from the side part carrier part 34), which in an operating mode engages with or in a second locking element 64.

The references 52 and 54 designate temperature control means connections or temperature control connections which serve for controlling the temperature of the base part of the blow mould.

Figure 3:
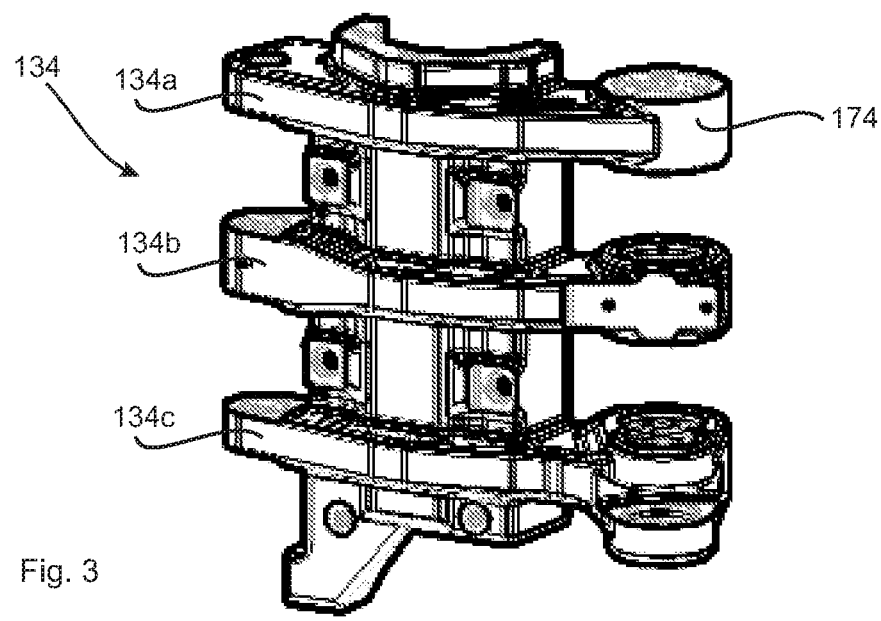
FIG. 3 shows a representation of a side part carrier according to the known art.

FIG. 3 shows a side part carrier 134 according to the internal known art in the name of the applicant. Furthermore, the side part carrier 134 has three reinforcing ribs 134a, 134b and 134c, which extend horizontally here in an operating mode. These reinforcing ribs also have the articulated connections 174, with which the side part carrier is articulated pivotably on the shaft 72 shown in FIG. 2.

Figure 4:
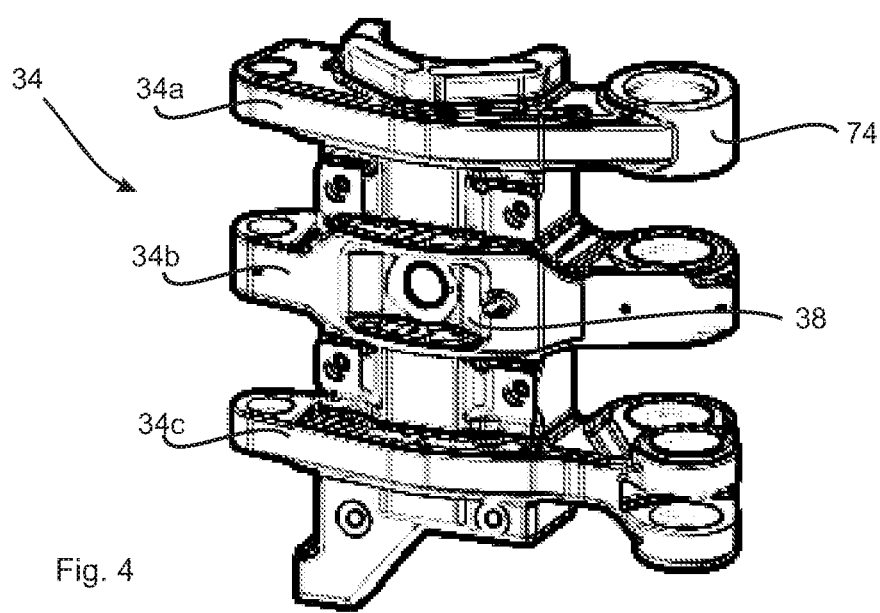
FIG. 4 shows a representation of a side part carrier according to embodiments of the invention.

FIG. 4 shows a side part carrier 34 according to embodiments of the invention. Also, this side part carrier has three reinforcing ribs 34a, 34b and 34c. The reference 38 designates a recess, in which a fastening mechanism (not shown) is arranged in order to arrange the corresponding side part of the blow mould (not shown) directly on the side part carrier 34. In this case this recess can be configured in such a way that the fastening mechanism can also be arranged oblique, as explained in the following drawings.

Figure 5:
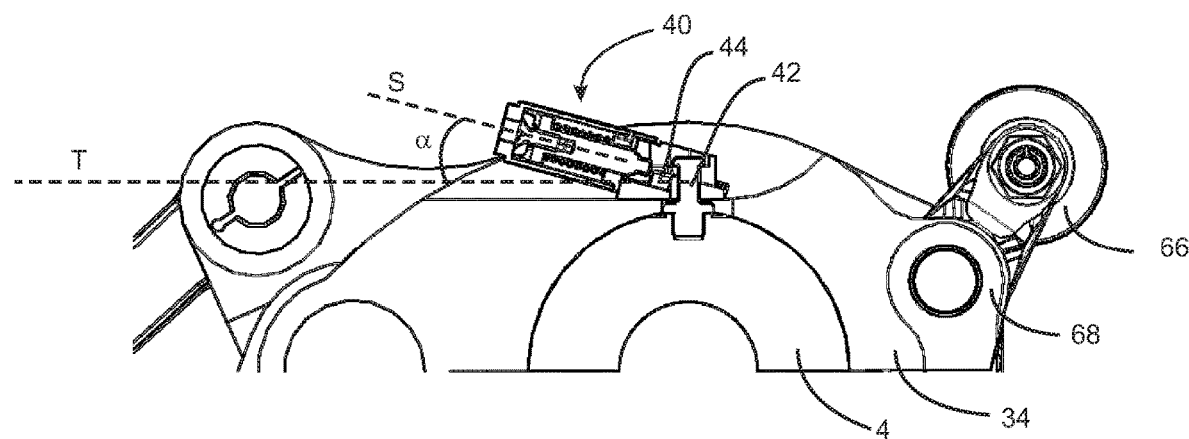
FIG. 5 shows a representation of a side part carrier with blow mould and fastening mechanism.

FIG. 5 shows a schematic representation of a side part 4 of a blow mould which is arranged on the side part carrier 34. In this case it will be recognised that the side part 4 is arranged directly on the mould carrier part, that is to say, without a mould carrier shell placed between them.

The reference numeral 42 designates a projection which is arranged on the side part 4 and which serves for holding the side part 4. In this case this projection 42 can be screwed in, glued in, clamped, welded or arranged in another way by force fitting thereon. This projection 42 is engaged behind by an engagement means 44 and is drawn in the direction of the side part carrier. Accordingly, the reference 40 designates the entire fastening mechanism.

The reference S designates a tensioning direction in which a piston, on which in turn the engagement means 44 is arranged, is movable. The reference T designates a tangential direction which, in a closed state of the blow mould, bears tangentially on the blow mould. An angle between this tangential direction T and the tensioning direction S can be for example between 10° and 20°, between 12° and 18° and between 13° and 17°. In this case the tensioning direction cannot intersect a geometric central axis of the individual transforming stations.

Figures 6A, 6B:
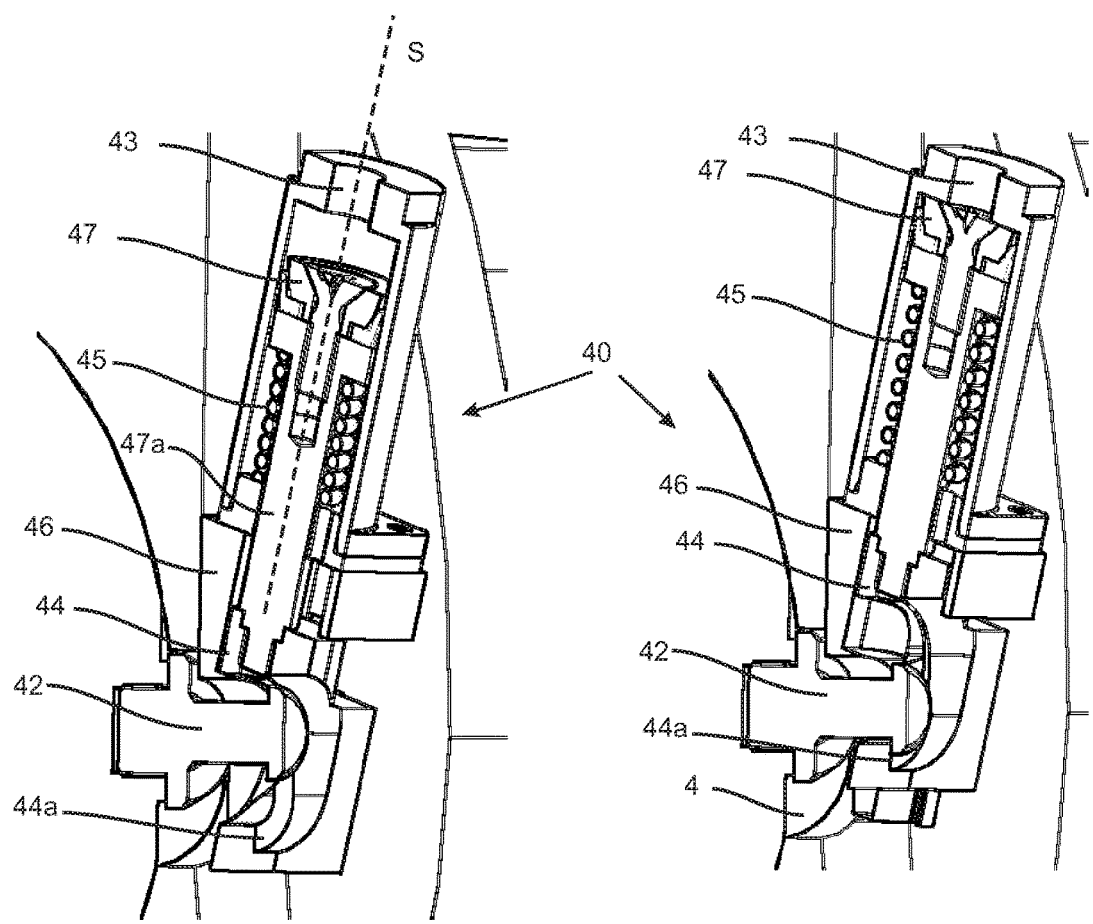
FIG. 6a shows a first representation of the fastening mechanism in a first position.
FIG. 6b shows a second representation of the fastening mechanism in a second position.

FIGS. 6a and 6b show the fastening mechanism 40 in two different positions. In this case this involves in particular compressed air, which causes a piston element 47 or a piston 47 to be moved in the tensioning direction S, and in fact to be pressed downwards here. This causes an opening of the fastening mechanism 40. The reference 45 designates a spring device or a spring which, in a state not acted upon by a pressure means, presses the piston 47 upwards, that is to say, into a tensioned position.

The reference 44 designates a locking means, which is engaged behind by the bolt 42 arranged on the blow mould 4 and so can pull this bolt towards the right in FIG. 6a.

In the state shown in FIG. 6a the fastening mechanism is released or the blow mould could be released from the side part carrier. In the state shown in FIG. 6b, the piston 47 is advanced upwards and the fastening means is closed, with the result that also the blow mould is securely locked on the blow mould carrier.

Therefore, in the context of the embodiments a wedge locking is proposed. In this case the fixing bolt or the projection 42 of the blow mould is tensed via a keyhole cutout in a wedge 44. Due to the arrangement under 45°, both of the spring device 45 and also of the unlocking cylinder 47a, a costly connecting rod actuation is not necessary. In this way lower costs can be attained, since simpler and fewer components are used.

An active unlocking leads to handling of the mould with a secure process and without disruption. The holding contact surface is greater than systems which are known from the known art, which further reduces the wear. The holding force is also enlarged by the 15° wedge geometry. The tensioning path is three times greater and a malfunction due to wear is precluded by the high automatic readjustment path. The very small locking unit may also be integrated into any mould carrier, that is to say, also for narrow or small blow moulds.

Figure 7A:
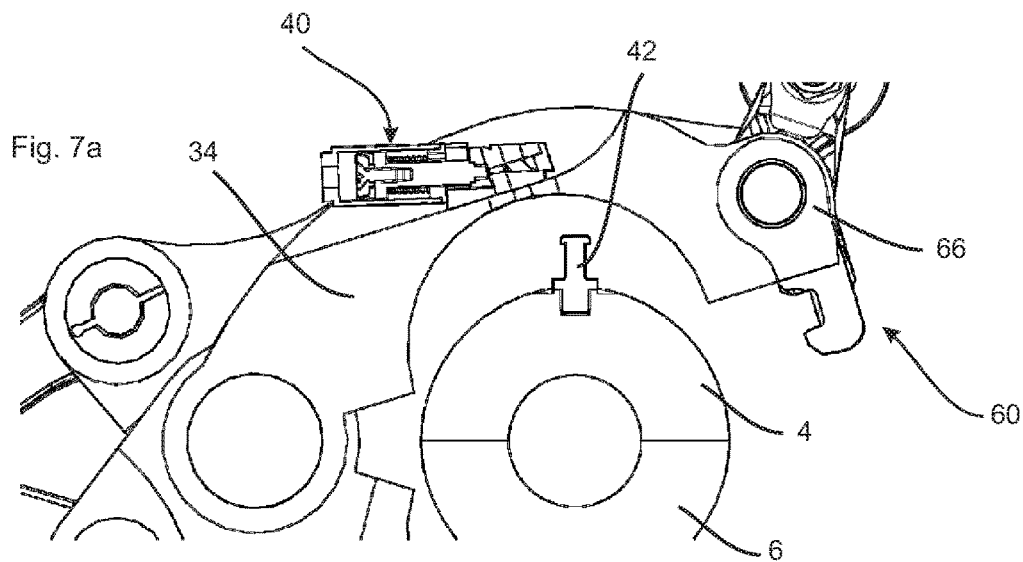
FIG. 7a shows a first representation for locking of the fastening mechanism.
Figure 7B:
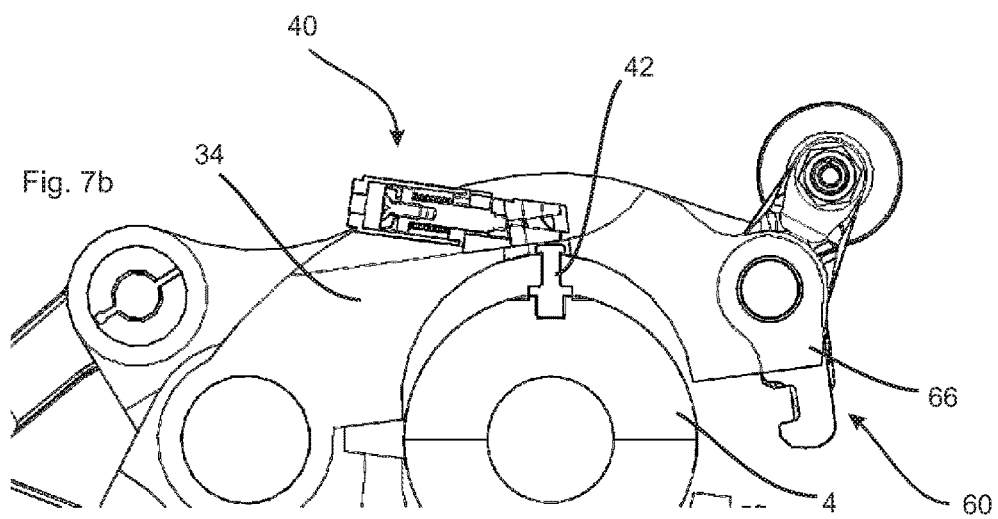
FIG. 7b shows a second representation for locking of the fastening mechanism.
Figure 7C:
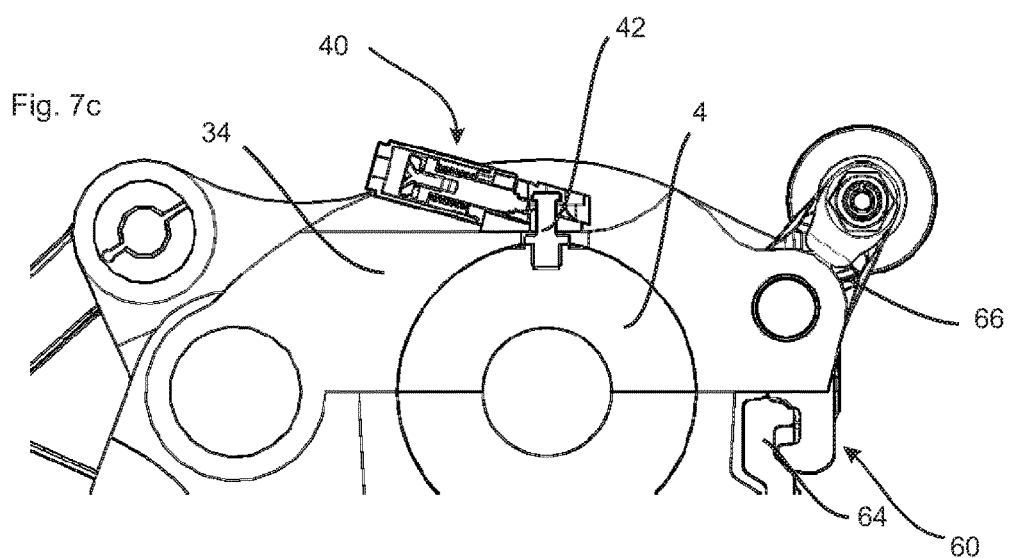
FIG. 7c shows a third representation for locking of the fastening mechanism.
Figure 7D:
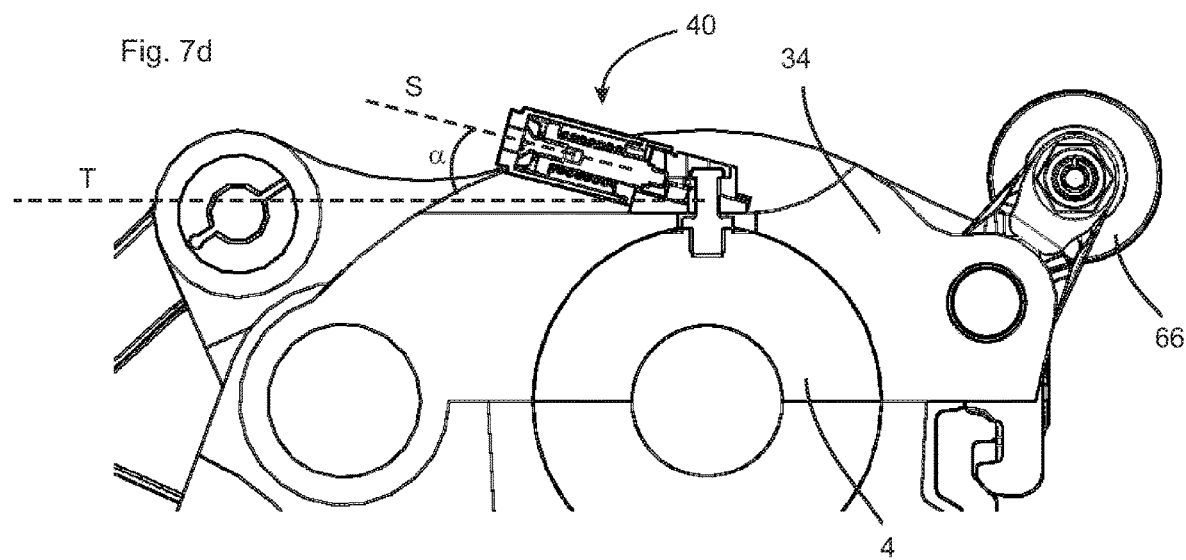
FIG. 7d shows a fourth representation for locking of the fastening mechanism.

FIGS. 7a to 7d show four representations for locking the blow mould. In the situation shown in FIG. 7a the side part carrier 34 is still spaced apart from the side part 4 and the fastening mechanism 40 is in an unlocked state for example by application of pressure at 9.5 bar. In the state shown in FIGS. 7b and 7c, the side part carrier 34 is closed around the side part 4. This takes place by closing of both side part carriers 34 and (not shown) 36 with respect to the blow mould side parts. It can be seen in FIG. 7c that the projection is now engaged completely in the hole of the locking means or of the wedge element 44. The fastening system 44 is still in an open state. If now, as shown in FIG. 7d, the system is connected without pressure, the spring device 45 and the fastening mechanism 40 lock. In this case the locking element 44 is moved along the tensioning direction, that is to say here: moves obliquely towards the left and thus engages behind the projection 42. The side part of the blow mould is now fastened to the mould part carrier 34.

Figure 8:
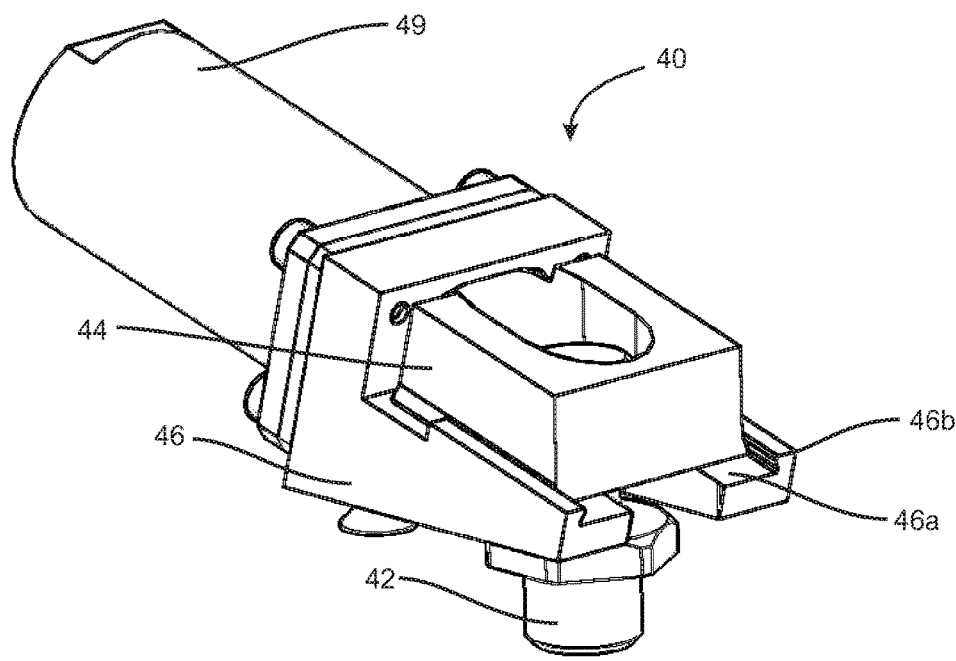
FIG. 8 shows a detail of the fastening mechanism.

FIG. 8 shows a further representation of a detail of the fastening mechanism 40. Here again, the wedge element 44 is shown, which is displaceable relative to the surface 46a which is inclined at the above-mentioned angle of 15°. The reference 46b designates a dovetail guide in order to hold the wedge element 44. On the other hand, the element 46 is stationary. The reference 49 designates a guide sleeve, inside which the piston and also the spring device 45 are arranged.

FIG. 9a shows a transforming station. In this case the two side part carriers 34, 36 are shown as well as the blow mould part 4 arranged on the side part carrier 34. In addition, the fastening mechanism 40 can also be seen. The references 82 and 84 relate to media couplings which serve in order to deliver a temperature control means or temperature control to the side part carriers 34 and 36. In this way the side part carriers and, with them, also the blow moulds can be temperature-controlled, for example cooled.

The reference 88 designates a shock absorber for damping the shocks occurring during closing of the blow mould. The reference 86 designates a stop or a stop means which acts between the side part carrier and the side part.

FIG. 9b shows the side part carrier 36 with the fastening mechanism 40 arranged thereon. The reference 48 designates a pneumatic connection. By means of this pneumatic connection 48 the fastening mechanism can be acted upon by compressed air in order to release it.

FIG. 9c shows a further representation of the side part carrier. In this case the channels 92, 94, 96 and 98 for the temperature control means can also be seen, which can flow in the interior of the side part carrier in order to control the temperature thereof. In this case these channels extend in each case rectilinearly and partially in a vertical direction and partially in a horizontal direction. In this way a temperature control means can be distributed within the side part carrier in order to completely control the temperature thereof.

However, it is pointed out that instead of the fastening mechanism shown in the preceding drawings, another fastening mechanism known from the internal known art of the applicant can be used. This fastening mechanism 40 is illustrated in FIG. 10 and can be used both for the fastening of the base mould and also for the fastening of the side parts.

In this case a release element 162 is provided, which in a normal operational state is pressed downwards by a spring element 165. In this way the locking element 164 is pressed outwards by the oblique surface 162a and in this way engages in a fastening element 166. A separation between the element 172 and the carrier 112 can be prevented by this engagement. If compressed air is now applied to a receiving chamber 167, the actuating element 162 will move upwards and in this way the locking element 164 will retract again and therefore will no longer be in engagement with the fastening element 166. In this position the fastening element 119 and thus also the base part here can be lifted off upwards in the direction L. It is pointed out that FIG. 10 shows a fastening mechanism for a base part, but this can also be used in an analogous manner for fastening the side parts.

Simultaneously it is also possible that connection devices can be separated, albeit delayed in time. The reference 169 relates to a guiding device which serves for guiding the release element 162. This guiding device 169 can engage in a hole of the release element 162, so that the release element 162 can slide relative to the guiding device 169, but in this case is guided by this guiding device 169. Thus, the locking element is movable in the direction R shown in FIG. 10.

In general, within the context of the invention a fastening mechanism can be used, which can be actuated by means of a flowable medium in order to unlock the side part relative to the side part carrier. At least one fastening mechanism is configured in such a way that it is in a locked state in a pressureless state with respect to the liquid or flowable medium. Advantageously, the fastening mechanism can be brought from a locked state into an unlocked state by the application of a predetermined pressure of the flowable medium, wherein this pressure is greater than 2 bars, greater than 4 bars and particularly greater than 6 bars.

In further preferred embodiments, the fastening mechanism has a pretensioning device by which at least one blow mould part is fixed by non-positive and/or positive engagement on the side part carrier associated with this blow mould part. This pretensioning device can be acted upon by the flowable medium.

In further preferred embodiments, the fastening mechanism has a movable piston which is displaceable by means of the flowable medium into a first position and/or is displaceable by means of a pretensioning device into a second position.

FIGS. 11a and 11b show further embodiments of a fastening mechanism. In these embodiments the tensioning direction is perpendicular to the above-mentioned radial direction R of the blow mould part or even parallel to the above-mentioned tangential direction. In these embodiments, the engagement element is formed as a sleeve-like body which surrounds and engages behind the projection 42. This tubular body 55 is movable in the radial direction R of the blow mould. FIG. 11a shows a blow mould in a locked state and FIG. 11b shows it in an unlocked state. In this case the sleeve-like body can be movable relative to the side part carrier in the direction R.

FIGS. 12a-12c show three representations of the fastening mechanism shown in FIGS. 11a-11c. Here in turn in FIG. 12a the piston element 47a can also be seen, which engages in a guide body 57. This guide body 57 here is arranged stationary relative to the side part carrier. Due to a movement of the piston element 47a in the tensioning direction an expansion body 56 can be moved, more precisely in FIG. 12b downwards or in a radial direction of the sleeve body 55.

As a result, an oblique surface of this expansion body is moved relative to an oblique surface 55a of the sleeve-like body 55 and the sleeve body is moved as mentioned above. Thus, a movement of the sleeve-like body takes place here indirectly through a movement of the piston element and a transmission of force from the piston element 47a onto the expansion element 56 and from the expansion element in turn onto the sleeve-like body.

In FIG. 12c an end portion of the piston element 47a is also shown. This end portion 47a has two oblique surfaces 47b which, during a movement of the piston element, produce a movement of the expansion body 56 and thus ultimately also of the sleeve-like body 55.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCES 4 side part of the blow mould
6 side part of the blow mould
20 transforming station
34 side part carrier 34a-c reinforcing ribs
36 side part carrier
36a-c reinforcing ribs
38 recess
40 fastening mechanism
42 projection
44 locking means, wedge
45 spring device
46 element of the fastening mechanism
46a surface of the element 46
46b dovetail guide
47 piston element
47a piston
47b oblique surface
48 pneumatic connection
52,54 temperature control means connections
53 rotatable carrier
55 sleeve-like engagement element
55a oblique surface of the sleeve-like engagement element
56 expansion body
60 locking mechanism
62 first locking element
64 second locking element
72 shaft
112 carrier
119 fastening element
134, 136 side part carrier (known art)
134a-c reinforcing ribs (known art)
162 release element
162a oblique surface
164 locking element
165 spring element
166 fastening element
169 guiding device
172 element
174 articulated connection
HR radial main direction
R radial direction
Z centre of rotation
M geometric central axis of the transforming stations
S tensioning direction
T tangential direction
L direction

The invention claimed is:

1. A transforming station for transforming plastic parisons into plastic containers with a blow mould for transforming plastic parisons into plastic containers, this blow mould having a base part, a first side part and a second side part, wherein, in an assembled state of the blow mould, this base part with the side parts form a hollow space within which the plastic parisons can be expanded to form the plastic containers and with a carrier device for carrying the blow mould, wherein the carrier device has a first side part carrier and a second side part carrier and wherein the first side part is arranged on the first side part carrier and the second side part is arranged on the second side part carrier, wherein the first side part is arranged directly on the first side part carrier and the second side part is arranged directly on the second side part carrier without the use of a pressure pad and without the use of mould carrier shells.

2. The transforming station according to claim 1, wherein the other side part is also arranged directly on the side part carrier associated with it.

3. The transforming station according to claim 1, wherein at least one of a side part carrier and a side part can be temperature-controlled.

4. The transforming station according to claim 1, wherein at least one side part carrier and/or a side part can have at least one temperature control means channel for conducting a flowable temperature control means or a temperature control.

5. The transforming station according to claim 1, wherein at least one of both side part carriers and both side parts can have at least one temperature control means channel or temperature control means channel for conducting a flowable temperature control means or a flowable temperature control.

6. The transforming station according to claim 1, wherein at least one of the side part carrier and a side part has at least two media couplings and these two media couplings have a forward flow and a return flow for a temperature control means or a temperature control.

7. The transforming station according to claim 1, wherein the at least two media couplings are manually, semi-automatically or fully automatically releasable.

8. The transforming station according to claim 1, wherein the at least two media couplings are designed to be self-sealing.

9. The transforming station according to claim 1, wherein the transforming station can be designed to be sterilisable.

10. The transforming station according to claim 1, wherein the transforming station can be arranged in a clean room.

11. The transforming station according to claim 1, wherein at least one side part is fastened to the side part carrier associated with it by means of a fastening mechanism and at least one component of this fastening mechanism is integrated at least partially into a side part carrier.

12. The transforming station according to claim 1, wherein the side part carriers have reinforcing ribs and these reinforcing ribs of the two side part carriers are offset with respect to one another in the longitudinal direction of the respective side part carriers.

13. An apparatus for transforming plastic parisons into plastic containers with a movable carrier, on which a plurality of transforming stations according to claim 1 are arranged.

14. The apparatus according to claim 13, wherein the side part carriers of the transforming stations have reinforcing ribs and the reinforcing ribs of two side part carriers which are adjacent to one another and are associated with adjacent transforming stations are offset with respect to one another in a height direction of the transforming station.

15. A reshaping station for reshaping plastic parisons into plastic containers with a blow mould for reshaping plastic parisons into plastic containers, this blow mould having a base part, a first side part and a second side part, wherein, in an assembled state of the blow mould, this base part with the side parts form a hollow space within which the plastic parisons can be expanded to form the plastic containers and furthermore a carrier device for carrying the blow mould is provided, wherein the carrier device has a first side part carrier and a second side part carrier and wherein the first side part is arranged on the first side part carrier and the second side part is arranged on the second side part carrier, wherein at least one side part is arranged directly on the side part carrier associated with it by means of a fastening mechanism, and this fastening mechanism has a tensioning element which is movable in a tensioning direction for tensioning the fastening mechanism, wherein this tensioning direction deviates from a radial direction of the blow mould part.

16. The reshaping station according to claim 15, wherein the fastening mechanism has an engageable projection fastened to the blow mould part, as well as an engagement element which engages behind this projection at least in part, wherein this engagement element is movable in the tensioning direction.

17. The reshaping station according to claim 15, wherein the tensioning direction is arranged relative to the radial direction at an angle different from 0°.

18. The reshaping station according to claim 15, wherein the tensioning direction is arranged relative to the radial direction at an angle ($\alpha$) of at least one of greater than 20°, greater than 30°, greater than 40°, greater than 45°, greater than 50°, greater than 60°, greater than 70° and greater than 75°.

19. The reshaping station according to claim 15, wherein the tensioning element has a piston to which pressure can be applied.

20. The reshaping station according to claim 19, wherein an inclined surface for movement of the engagement element is formed on the piston.

21. The reshaping station according to claim 16, wherein the engagement element is a wedge element with a wedge surface.

22. The reshaping station according to claim 21, wherein the wedge surface can be inclined relative to the tensioning direction by a predetermined angle different from 0°.

23. The reshaping station according to claim 16, wherein the engagement element is formed as a sleeve-like body.

24. The reshaping station according to claim 23, wherein the sleeve-like body is movable in a direction which deviates from the tensioning direction and which is perpendicular to the tensioning direction.

25. The reshaping station according to claim 15, wherein the fastening mechanism has a spring element which pushes the fastening mechanism into a closed position.

26. The reshaping station according to claim 15, wherein the tensioning element is arranged on the side part support.

27. The reshaping station according to claim 15, wherein at least one side part is fastened to the side part carrier associated with it and at least one component of this fastening mechanism is passed through an opening arranged in the side part carrier.

28. The reshaping station according to claim 27, wherein the opening is arranged in a reinforced portion of the side part support.

29. A machine for reshaping plastic parisons into plastic containers with a movable rotatable support, on which a plurality of reshaping stations according to claim 15 are arranged.

* * * * *